United States Patent
Susca et al.

(10) Patent No.: US 12,411,503 B2
(45) Date of Patent: Sep. 9, 2025

(54) HIGH TURN DOWN RATIO DIRECT CONTROL FOR VARIABLE DISPLACEMENT PUMPS WITH FLOW SENSING

(71) Applicant: Hamilton Sundstrand Corporation, Charlotte, NC (US)

(72) Inventors: Ryan Prescott Susca, Windsor, CT (US); Ryan Shook, Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/096,949

(22) Filed: Jan. 13, 2023

(65) Prior Publication Data

US 2024/0241526 A1   Jul. 18, 2024

(51) Int. Cl.
*G05D 7/06* (2006.01)
*F02C 7/22* (2006.01)
(Continued)

(52) U.S. Cl.
CPC .............. *G05D 7/0688* (2013.01); *F02C 7/22* (2013.01); *F02C 7/236* (2013.01); *F02C 9/30* (2013.01);
(Continued)

(58) Field of Classification Search
CPC ................ G05D 7/0623; G05D 7/0688; Y10T 137/86027; F02C 7/22; F02C 7/236; F02C 9/30; F04B 49/035; F04B 49/065; F04B 49/22; F04B 49/24; F04B 49/002; F04B 2205/05; F04B 2205/09
(Continued)

(56) References Cited

U.S. PATENT DOCUMENTS 5,017,099 A   5/1991   Tan
5,806,300 A   9/1998   Veilleux et al.
(Continued)

FOREIGN PATENT DOCUMENTS

EP   1146214 B1   8/2011
EP   4296492 A1   12/2023

OTHER PUBLICATIONS

Extended European Search Report dated Mar. 15, 2024, for corresponding European Patent Application No. 24151656.6.
(Continued)

*Primary Examiner* — William M McCalister
(74) *Attorney, Agent, or Firm* — Kinney & Lange, P.A.

(57) ABSTRACT

A system includes a variable displacement pump (VDP) in fluid communication with an inlet line and with an outlet line. A bypass valve (BPV) includes a BPV inlet in fluid communication with the outlet line, and a BPV outlet in fluid communication with a bypass line that feeds into the inlet line upstream of the VDP. An actuator is operatively connected to control the BPV to vary flow from the BPV inlet to the bypass line. A flow sensing valve (FSV) is connected in the outlet line. The FSV includes a sensor configured to generate sensor data indicative of flow out of the outlet line. A controller operatively connected to the actuator to control recirculation flow passed through the BPV based on the sensor data and based on a predetermined low threshold of flow through the VDP.

13 Claims, 1 Drawing Sheet

(51) Int. Cl.
*F02C 7/236* (2006.01)
*F02C 9/30* (2006.01)
*F04B 49/00* (2006.01)
*F04B 49/035* (2006.01)
*F04B 49/06* (2006.01)
*F04B 49/22* (2006.01)
*F04B 49/24* (2006.01)

(52) U.S. Cl.
CPC .......... *F04B 49/002* (2013.01); *F04B 49/035* (2013.01); *F04B 49/065* (2013.01); *F04B 49/22* (2013.01); *F04B 49/24* (2013.01); *G05D 7/0623* (2013.01); *F04B 2205/05* (2013.01); *F04B 2205/09* (2013.01)

(58) Field of Classification Search
USPC ....................................................... 137/565.16
See application file for complete search history.

(56) References Cited

U.S. PATENT DOCUMENTS

| | | | |
|---|---|---|---|
| 6,065,451 A | | 5/2000 | Lebrun |
| 6,102,001 A | * | 8/2000 | McLevige .................. F02C 9/26 |
| | | | 123/387 |
| 6,162,022 A | | 12/2000 | Anderson et al. |
| 6,192,681 B1 | | 2/2001 | Tsuruga et al. |
| 6,216,456 B1 | | 4/2001 | Mitchell |
| 6,487,847 B1 | | 12/2002 | Snow et al. |
| 6,494,182 B1 | | 12/2002 | Djordjevic |
| 6,584,762 B2 | | 7/2003 | Snow et al. |
| 6,694,950 B2 | | 2/2004 | Djordjevic |
| 8,128,368 B2 | | 3/2012 | Bielefedt |
| 8,128,378 B2 | | 3/2012 | Rowan et al. |
| 8,162,619 B2 | | 4/2012 | Laskaris |
| 8,166,765 B2 | | 5/2012 | Baker et al. |
| 8,172,551 B2 | | 5/2012 | Baker |
| 8,192,172 B2 | | 6/2012 | Baker et al. |
| 8,302,406 B2 | | 11/2012 | Baker |
| 8,869,509 B2 | | 10/2014 | Baker |
| 9,574,500 B2 | | 2/2017 | Kelly et al. |
| 9,617,923 B2 | | 4/2017 | Griffiths |
| 9,850,917 B2 | | 12/2017 | Mueller et al. |
| 9,982,417 B1 | * | 5/2018 | Humble .................. E03B 1/042 |
| 10,655,622 B2 | | 5/2020 | McBrien |
| 10,788,025 B2 | | 9/2020 | Ishikura et al. |
| 10,822,772 B1 | | 11/2020 | Wright |
| 10,890,117 B2 | | 1/2021 | Chalaud et al. |
| 2003/0074884 A1 | * | 4/2003 | Snow .................. F02C 9/48 |
| | | | 60/764 |
| 2003/0192300 A1 | | 10/2003 | Mahoney et al. |
| 2004/0040595 A1 | * | 3/2004 | Youngpeter ............. F04C 14/26 |
| | | | 137/115.13 |
| 2004/0200459 A1 | | 10/2004 | Bennett et al. |
| 2005/0100447 A1 | | 5/2005 | Desai et al. |
| 2008/0289338 A1 | | 11/2008 | Desai |
| 2010/0037961 A1 | * | 2/2010 | Tysver ...................... F02C 7/22 |
| | | | 60/734 |
| 2010/0251814 A1 | | 10/2010 | Baker et al. |
| 2012/0090308 A1 | | 4/2012 | Yuan et al. |
| 2012/0315152 A1 | | 12/2012 | Baker |
| 2015/0027570 A1 | * | 1/2015 | Wi ........................... F15B 11/17 |
| | | | 137/565.13 |
| 2015/0167833 A1 | * | 6/2015 | Jo ........................... F04C 14/26 |
| | | | 137/565.13 |
| 2016/0189988 A1 | * | 6/2016 | Haga .................. H01J 37/32449 |
| | | | 137/1 |
| 2016/0341223 A1 | | 11/2016 | Marsch et al. |
| 2017/0030347 A1 | | 2/2017 | McBrien |
| 2017/0306856 A1 | | 10/2017 | Bickley |
| 2018/0340501 A1 | | 11/2018 | Ni et al. |
| 2018/0340531 A1 | | 11/2018 | Ni et al. |
| 2018/0372006 A1 | | 12/2018 | Chalaud et al. |
| 2022/0098066 A1 | * | 3/2022 | Benham .................. C02F 1/685 |
| 2022/0307491 A1 | | 9/2022 | Rutar |

OTHER PUBLICATIONS

Extended European Search Report for EP Application No. 24151443.9, Dated Jun. 17, 2024, pp. 6.

\* cited by examiner

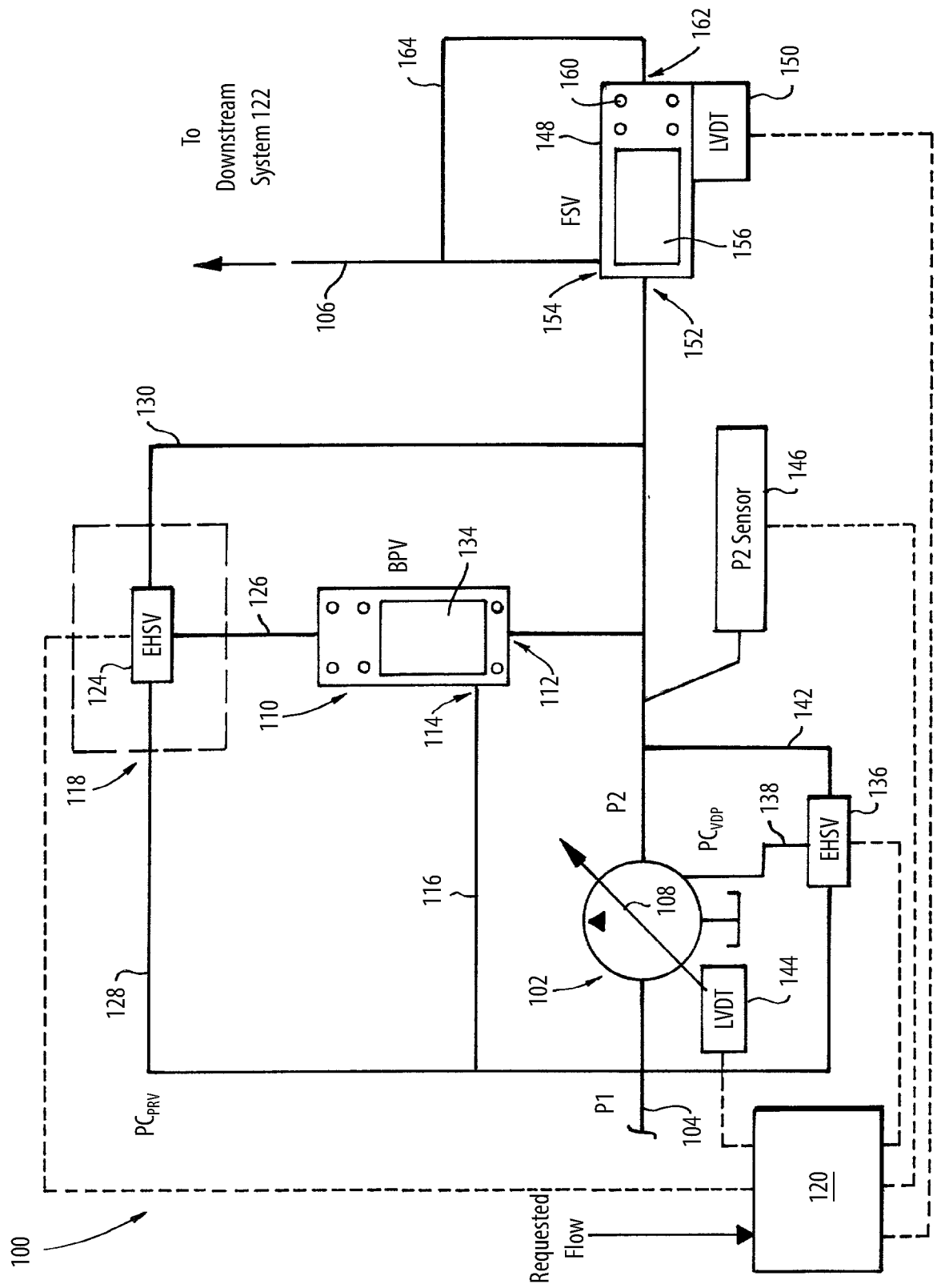

HIGH TURN DOWN RATIO DIRECT CONTROL FOR VARIABLE DISPLACEMENT PUMPS WITH FLOW SENSING

BACKGROUND

1. Field

The present disclosure relates to pump control, and more particularly to control for variable displacement pumps (VDPs).

2. Description of Related Art

In a pump, the turn-down ratio is the ratio of the pump's maximum flow to its minimum flow. In fuel delivery systems using a variable displacement pump (VDP), often the pump is subject to a high turn-down ratio. This can drive a pump design with a less than optimal pump efficiency throughout the operating range as a tradeoff for ensuring the turn-down ratio needed. For example, it is beneficial to pump design to minimize this turn-down ratio to be less than 4:1. But large displacement VDPs can struggle to function with such high turn down ratios in typical fuel metering systems because minimum pump pressure flows to support cooling the VDP are typically higher than the lowest flow for fuel burners, e.g. in gas turbine engines such as on aircraft.

The conventional techniques have been considered satisfactory for their intended purpose. However, there is an ever present need for improved systems and methods for control of VDPs. This disclosure provides a solution for this need.

SUMMARY

A system includes a variable displacement pump (VDP) in fluid communication with an inlet line and with an outlet line. The VDP includes a variable displacement mechanism configured to vary pressure to the outlet line. A bypass valve (BPV) includes a BPV inlet in fluid communication with the outlet line, and a BPV outlet in fluid communication with a bypass line that feeds into the inlet line upstream of the VDP. An actuator is operatively connected to control the BPV to vary flow from the BPV inlet to the bypass line. A flow sensing valve (FSV) is connected in the outlet line. The FSV includes a sensor configured to generate sensor data indicative of flow out of the outlet line. A controller operatively connected to the actuator to control recirculation flow passed through the BPV based on the sensor data and based on a predetermined low threshold of flow through the VDP. The BPV outlet can be the only outlet of the BPV so all flow through the BPV is supplied to the BPV outlet.

The controller can be configured to control the BPV to maintain a baseline flow through the BPV under a first condition wherein requested flow from the downstream system is above than the predetermined low threshold. The controller can be configured to control the BPV to increase the flow through the BPV above the baseline flow for a second flow condition wherein requested flow from the downstream system is at or below the predetermined low threshold.

A first electrohydraulic servo valve (EHSV) can be connected in fluid communication with the BPV by a first control line. The first EHSV can be connected in fluid communication with both the inlet line and with the outlet line through respective connection lines. The first EHSV can be operatively connected to the controller for active control of the first EHSV to actuate the BPV. A first position sensor can be operatively connected to the BPV to provide sensor output indicative of position of a valve member of the BPV. The first position sensor can be operatively connect the controller to provide feedback for controlling the BPV. A second EHSV can be connected in fluid communication with the variable displacement mechanism by a second control line for control of flow through the VDP. The second EHSV can be connected in fluid communication with both the inlet line and with the outlet line through respective connection lines. The second EHSV can be operatively connected to the controller for active control of the second EHSV to actuate the variable displacement mechanism. A second position sensor can be operatively connected to the variable displacement mechanism to provide sensor output indicative of position of the variable displacement mechanism. The second position sensor can be operatively connect the controller to provide feedback for controlling the variable displacement mechanism.

A pressure sensor can be operatively connected to the outlet line to generate sensor output indicative of pressure in the outlet line. The pressure sensor can be operatively connected to the controller for active control of the variable displacement mechanism and/or of the BPV based on pressure in the outlet line. The sensor output can be indicative of flow demanded by the downstream system supplied by the outlet line. The controller can be configured to control position of the valve member of the BPV to maintain bypass flow through the BPV in the second condition wherein the controller governs the bypass flow through the BPV according to $$BF = PF - DSFD$$

wherein BF is flow through the BPV, PF is flow through the VDP, and DSFD is flow demanded by the downstream system supplied by the outlet line as indicated by the sensor output.

The FSV can include an FSV inlet, an FSV outlet, and a valve member. A biasing member can bias the valve member in a first direction. Pressure of flow through the FSV from the FSV inlet to the FSV outlet can bias the valve member in a second direction opposite the first direction. The sensor can includes a position sensor operatively connected to monitor position of the valve member in the FSV to generate the sensor data. The FSV can include a pressure port on a side of the valve member opposite from the FSV inlet and the FSV outlet. A pressure line can connect the FSV outlet in fluid communication with the pressure port.

A method includes receiving sensor feedback from a flow sensing valve (FSV) indicative of flow demanded by a downstream system supplied from an outlet line of a variable displacement pump (VDP). The method includes controlling a bypass valve (BPV) to recirculate flow from the outlet line to an input line of the VDP in the event of the sensor feedback dropping below a predetermined low threshold of flow through the VDP.

The method can include controlling the BPV to recirculate flow from the outlet line to the inlet line at a constant base recirculation rate in the event of flow demanded by the downstream system being at or above the predetermined low threshold of flow through the VDP. The base recirculation rate can be zero recirculation flow. The method can include receiving pressure data from a pressure sensor in the outlet line. Controlling the BPV to recirculate flow can include controlling the BPV based at least in part on the pressure data.

Controlling the BPV to recirculate flow can include governing the bypass flow through the BPV according to $$BF = PF - DSFD$$

wherein BF is flow through the BPF, PF is flow through the VDP, and DSFD is flow demanded by the downstream system supplied by the outlet line as indicated by the sensor feedback. The method can include receiving data from a sensor indicative of position of a valve member of the BPV, wherein controlling the BPV includes controlling the BPV based on position of the valve member.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1 is a schematic view of an embodiment of a system constructed in accordance with the present disclosure, showing the connections of the variable displacement pump (VDP) and a bypass valve (BPV).

DETAILED DESCRIPTION OF THE PREFERRED EMBODIMENTS

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. The systems and methods described herein can be used to provide high turn down ratios for variable displacement pumps, and for control of the same, such as for use in supplying fuel to gas generators in aircraft engines.

The system 100 includes a variable displacement pump (VDP) 102 in fluid communication with an inlet line 104 and with an outlet line 106. The VDP 102 includes a variable displacement mechanism 108 configured to vary pressure to the outlet line 106. A bypass valve (BPV) 110 includes a BPV inlet 112 in fluid communication with the outlet line 106, and a BPV outlet 114 in fluid communication with a bypass line 116 that feeds into the inlet line 104 upstream of the VDP 102. An actuator 118 is operatively connected to control the BPV 110 to vary flow from the BPV inlet 112 to the bypass line 116. A flow sensing valve (FSV) 148 is connected in the outlet line 106. The FSV 148 includes a sensor 150, such as a linear variable differential transformer (LVDT), configured to generate sensor data indicative of flow out of the outlet line 106 to the downstream system 122 supplied by the outlet line 106.

A controller 120 is operatively connected to the actuator 118 to control recirculation flow passed through the BPV 110 based on the sensor data and based on a predetermined low threshold of flow through the VDP 102. The downstream system 122 can be a combustor, augmenter, or other gas generator of a gas turbine engine, for example. The low threshold of flow of the VDP 104 can be the threshold below which the VDP 104 cannot self-lubricate, or other design requirements for low or minimum flow. The BPV outlet 114 can be the only outlet of the BPV 110 so all flow through the BPV 110 from the BPV inlet 112 is supplied to the BPV outlet 114.

The controller 120 is configured, e.g. including analog circuitry, digital logic, and/or machine readable instructions, to control the BPV 110 to maintain a baseline flow through the BPV 110 under a first condition wherein requested flow from the downstream system 122 is above the predetermined low threshold. The controller 120 is configured to control the BPV 110 to increase the flow through the BPV 110 above the baseline flow for a second flow condition wherein requested flow from the downstream system 122 is at or below the predetermined low threshold.

The actuator 118 includes a first electrohydraulic servo valve (EHSV) 124 that is connected in fluid communication with the BPV 110 by a first control line 126. The first EHSV 124 is connected in fluid communication with both the inlet line 104, by way of the recirculation line 116, and with the outlet line 106 through respective connection lines 128, 130. The first EHSV 124 is operatively connected to the controller 120 for active control of the first EHSV 124 to actuate the BPV 110.

A first position sensor 132, such as a linear variable differential transformer (LVDT), is operatively connected to the BPV 110 to provide sensor output indicative of position of a valve member 134 of the BPV 110 within the BPV 110. The first position sensor 132 is operatively connect the controller 120 to provide feedback for controlling the BPV 110. A second EHSV 136 is connected in fluid communication with the variable displacement mechanism 108 by a second control line 138 for control of flow through the VDP 102. The second EHSV 136 is connected in fluid communication with both the inlet line 104 and with the outlet line 106 through respective connection lines 140, 142. The second EHSV 136 is operatively connected to the controller 120 for active control of the second EHSV 136 to actuate the variable displacement mechanism 108 to control flow through the variable displacement mechanism 108. A second position sensor 144, such as an LVDT, is operatively connected to the variable displacement mechanism 108 to provide sensor output indicative of position of the variable displacement mechanism 108, wherein the second position sensor 144 is operatively connect the controller 120 to provide feedback for controlling the variable displacement mechanism 108.

A pressure sensor 146 is operatively connected to the outlet line 106 to generate sensor output indicative of pressure in the outlet line 106. The pressure sensor 146 is operatively connected to the controller 120 for active control of the variable displacement mechanism 108 and/or of the BPV 110 based on pressure in the outlet line 106. The sensor output of sensor 150 is indicative of flow demanded by the downstream system 122. The controller 120 is configured to control position of the valve member 134 of the BPV 110 to maintain bypass flow through the BPV in the second condition, i.e. when recirculation through the BPV 110 is needed because flow demanded by the downstream system 122 drops below the predetermined low threshold for flow through the VDP 102. In this second condition, the controller 120 governs the bypass flow through the BPV 110 according to $$BF = PF - DSFD$$

wherein BF is flow through the BPV 110, PF is flow through the VDP 102 (e.g. as indicated by sensors 144 and/or 146), and DSFD is flow demanded by the downstream system 122 as indicated by the sensor output of the sensor 150. In the first condition, e.g. when flow demanded by the downstream system 122 is at or above the predetermined low threshold for flow through the VDP 112, the controller 120 controls the BPV 110 to recirculate flow from the outlet line 106 to the inlet line 102 at a constant base recirculation rate. The base recirculation rate can be zero recirculation flow.

The FSV 148 includes an FSV inlet 152, an FSV outlet 154, and a valve member 156 that moves inside the FSV 148 based on how much pressure is acting on the valve member 156. A biasing member 158 biases the valve member 156 in a first direction, e.g. the biasing member 160 can bias the valve member to the left as oriented in FIG. 1. Pressure of flow through the FSV 148 from the FSV inlet 152 to the FSV outlet 154 biases the valve member 156 in a second direction opposite the first direction, e.g. to the right as oriented in FIG. 1. The sensor 150 includes a position sensor operatively connected to monitor position of the valve member 156 in the FSV 148 to generate the sensor data indicative of that position. The FSV 148 includes a pressure port 162 on a side of the valve member 156 opposite from the FSV inlet 152 and the FSV outlet 154. A pressure line 164 connects the FSV outlet 154 in fluid communication with the pressure port 162. The pressure port 162 of the FSV 148 connects the backside of the FSV 148 to the downstream pressure in the outlet line 106, via the pressure line 164. The pressure balance on the FSV 148 is pump outlet pressure versus the sum of pressure from FSV outlet pressure (via pressure line 164) and from the spring force from biasing member 160. The biasing member 160 creates a constant pressure drop across the FSV 148 to allow for the controller 120 to calculate flow across the FSV 120.

Systems and methods as disclosed herein provide various potential benefits including the following. There can be a reduction in valve count and the need for a metering valve can be eliminated. The metering system can be faster than legacy systems, e.g. where a metering valve controls pressure control valve (PCV) which controls pump displacement or the like.

The methods and systems of the present disclosure, as described above and shown in the drawings, provide for high turn down ratios for variable displacement pumps, and for control of the same, such as for use in supplying fuel to gas generators in aircraft engines. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method comprising:
   Receiving sensor feedback from a flow sensing valve (FSV) indicative of flow demanded by a downstream system supplied from an outlet line of a variable displacement pump (VDP);
   operating an electrohydraulic servo valve (EHSV) such that a pressure of a control line for a bypass valve (BPV) is lower in response to the sensor feedback dropping below the predetermined low threshold of flow through the VDP;
   opening the BPV to redirect flow from the pump outlet line to a system inlet line in reaction to the pressure of the control line being lower; and
   controlling a second EHSV such that a second pressure of a second control line for a variable displacement mechanism of the VDP is varied, and thereby varying a pressure of the pump outlet line.

2. The method as recited in claim 1, wherein the flow from the outlet line to the inlet line is recirculated at a constant base recirculation rate in response to the flow demanded by the downstream system being at or above the predetermined low threshold of flow through the VDP.

3. The method as recited in claim 2, wherein the base recirculation rate is zero recirculation flow.

4. A system comprising:
   a variable displacement pump (VDP) fluidically connected to an inlet line and fluidically connected to a pump outlet line, wherein the VDP comprises a variable displacement mechanism configured to vary pressure to the pump outlet line;
   a bypass valve (BPV) comprising a BPV inlet fluidically connected with the pump outlet line, and a BPV outlet fluidically connected to a bypass line that feeds into the inlet line;
   an actuator comprising a first electrohydraulic servo valve (EHSV), wherein the first EHSV is fluidically connected to the BPV by a first control line;
   a lower-pressure line fluidically connecting the first EHSV to the inlet line;
   a higher-pressure line fluidically connecting the first EHSV to the pump outlet line;
   a flow sensing valve (FSV) fluidically connected to the pump outlet line, wherein the FSV comprises a sensor configured to generate sensed flow out of the pump outlet line;
   a controller connected to the first EHSV and configured to control recirculation flow through the BPV based on the sensed flow out of the pump outlet line and based on a predetermined low threshold of flow through the VDP, wherein:
   the controller is configured to:
     control the BPV to maintain a baseline flow through the BPV during a first flow condition in which requested flow from the downstream system is above the predetermined low threshold; and
     control the BPV to increase flow through the BPV above the baseline flow during a second flow condition in which the requested flow from the downstream system is at or below the predetermined low threshold; and
   a first position sensor connected to the BPV to provide sensor output indicative of a position of a valve member of the BPV, wherein the first position sensor is connected to the controller to provide a first feedback for controlling the BPV;
   a second electrohydraulic servo valve (EHSV) fluidically connected to the system inlet, fluidically connected to the pump output line, and fluidically connected with the variable displacement mechanism via a second control line, and
   wherein the controller is configured to actuate the variable displacement mechanism via the second EHSV.

5. The system of claim 4, wherein:
a second position sensor is connected to the variable displacement mechanism;
the second position sensor is connected to the controller;
the second position sensor is configured to provide a sensed variable displacement mechanism position to the controller; and
the controller is configured to respond to the sensed variable displacement mechanism position by controlling the variable displacement mechanism.

6. The system of claim 5, and further comprising a pressure sensor, wherein:
the pressure sensor is connected to the pump outlet line;
the pressure sensor is connected to the controller;
the pressure sensor is configured to provide a sensed pressure of the pump outlet line to the controller;
the controller is configured to respond to the sensed pressure of the pump outlet line by controlling the variable displacement mechanism and/or the BPV.

7. A system comprising:
a system inlet;
a system outlet downstream of the system inlet;
a pump inlet line fluidically connected to the system inlet;
a variable displacement pump (VDP) comprising:
  a variable displacement mechanism;
  a pump inlet fluidically connected to the pump inlet line; and
  a pump outlet fluidically connected to a pump outlet line;
a bypass valve (BPV) comprising:
  a BPV inlet fluidically connected to the pump outlet line downstream of the pump outlet;
  a BPV outlet downstream of the BPV inlet; and
  a valve member configured to control flow between the BPV inlet and the BPV outlet;
a bypass line fluidically connecting the BPV outlet to the pump inlet line;
a flow sensing valve (FSV) fluidically connected to the pump outlet line and downstream of the pump outline line, wherein the FSV comprises a FSV sensor configured to provide a sensed output flow of the system outlet line to a controller;
an actuator comprising a first electrohydraulic servo valve (EHSV), wherein the first EHSV comprises a first port, a second port, and a third port;
a lower-pressure line fluidically connected to the system inlet line and fluidically connected to the first port of the first EHSV;
a higher-pressure line fluidically connected to the pump outlet line and fluidically connected to the second port of the first EHSV; and
a first control line fluidically connecting the third port of the first EHSV to a control chamber of the BPV;
a first position sensor connected to the BPV and connected to the controller, wherein the first position sensor is configured to provide a sensed valve member position to the controller; and
a second EHSV connected to the controller, wherein the second EHSV comprises
a fourth port, a fifth port, and a sixth port; wherein:
  the fourth port is fluidically connected to the system inlet;
  the fifth port is fluidically connected to the pump output line;
  the sixth port is fluidically connected with the variable displacement mechanism via a second control line; and
  the controller is configured to actuate the variable displacement mechanism via the second EHSV;
wherein the first EHSV is configured to vary flow from the BPV inlet to the BPV outlet by controlling a pressure of the first control line;
wherein the controller is configured to actuate the variable displacement mechanism via the second EHSV; and
wherein the controller is configured to open the first port of the first EHSV and close the second port of the first EHSV under a first flow condition wherein a requested flow from a downstream system is above a predetermined low threshold.

8. The system as recited in claim 7, wherein the controller is configured to close the first port of the EHSV and open the second port of the EHSV under a second flow condition wherein a requested flow from a downstream system is at or below the predetermined low threshold.

9. The system as recited in claim 7 and further comprising a second position sensor connected to the controller, wherein the second position sensor is connected to the variable displacement mechanism and wherein the second position sensor is configured to provide a variable displacement mechanism position to the controller.

10. The system as recited in claim 9, and further comprising a pressure sensor connected to the controller, wherein the pressure sensor is connected to the pump outlet line and wherein the pressure sensor is configured to provide a sensed pump outlet line pressure.

11. The system as recited in claim 10, wherein:
the sensed output flow of the system outlet line is an indicator of the requested flow;
the controller is configured to control a position of the valve member of the BPV to maintain bypass flow through the BPV under the second flow condition; and
the controller governs the bypass flow through the BPV according to BF=PF-DSFD, wherein BF is the bypass flow through the BPV, PF is flow through the VDP, and DSFD is the flow demanded by the downstream system.

12. The system as recited in claim 7, wherein the FSV comprises:
an FSV inlet;
an FSV outlet;
a biasing member; and
a FSV valve member, wherein the biasing member biases the FSV valve member in a first direction.

13. The system as recited in claim 12, wherein the FSV comprises a pressure port on a side of the FSV opposite from the FSV inlet and the FSV outlet, wherein the FSV valve member is between the FSV inlet and the pressure port, and wherein a pressure line fluidically connects the FSV outlet to the pressure port.

* * * * *